Nov. 12, 1963 W. M. SHUTT, JR 3,110,166
UNIVERSAL JOINT SPIDER
Filed June 16, 1961 2 Sheets-Sheet 1

INVENTOR.
William M. Shutt, Jr.
BY
E. W. Christen
ATTORNEY

United States Patent Office 3,110,166
Patented Nov. 12, 1963

3,110,166
UNIVERSAL JOINT SPIDER
William M. Shutt, Jr., Saginaw, Mich., assignor to General Motors Corporation, Detroit, Mich., a corporation of Delaware
Filed June 16, 1961, Ser. No. 117,669
6 Claims. (Cl. 64—17)

This invention relates to universal joints, and more particularly to a universal joint spider that is formed by resistance welding.

In the design and manufacture of Cardan type universal joints, the common practice is to provide a spider or cross-shaft member to support the needle bearings and bearing caps that permit the relative rotation of the yokes of the joint. The common practice is to secure one yoke to opposite pairs of trunnions on the spider and to secure the other yoke to the remaining pair of trunnions on the spider.

In the past, the manufacture of the usual universal joint spider has presented numerous disadvantages. Such parts are normally produced by forging or casting a cross member and machining and grinding the ends of the stub shafts so produced to form bearing trunnions. This raises problems in the machining operations and in maintaining suitable tolerances and efficiencies in the manufacturing process. The result of these disadvantages is a relatively expensive part.

The device in which this invention is embodied comprises, generally, a universal joint spider which is formed by resistance welding under pressure two generally cylindrical members that have been premachined. The process is such that the axes of the trunnions lie in the same plane and the only operation necessary following the welding operation is in the grinding or polishing of the trunnion bearing surfaces. Premachining of the cylindrical members is much simpler to perform where no particular problems are presented in the manner in which the device is mounted in the cutting machine. Furthermore, the construction permits extruded or bar stock to be used for making the device, possibly eliminating all machining operations altogether. The result of these advantages is an extremely inexpensive, yet superior, universal joint spider.

These and other advantages will become more apparent from the following description and drawings, in which.

Figure 1:
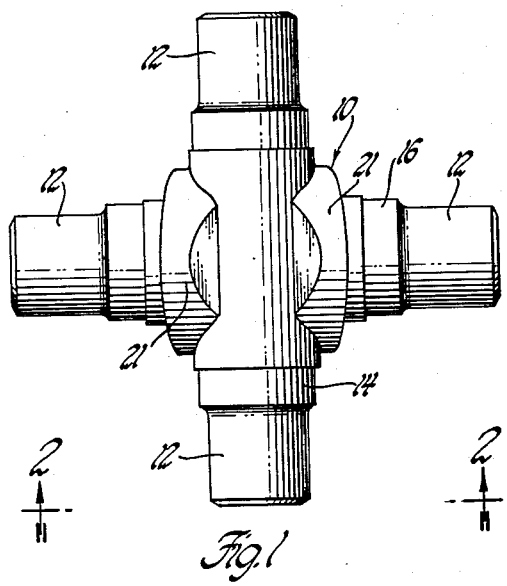
FIGURE 1 is a view of the universal joint spider in its final form.
Figure 2:
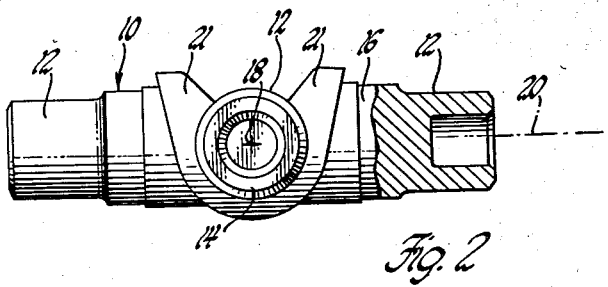
FIGURE 2 is a side view of the device illustrated in FIGURE 1 taken substantially along the line 2—2 of FIGURE 1 and looking in the direction of the arrows.
Figure 3:
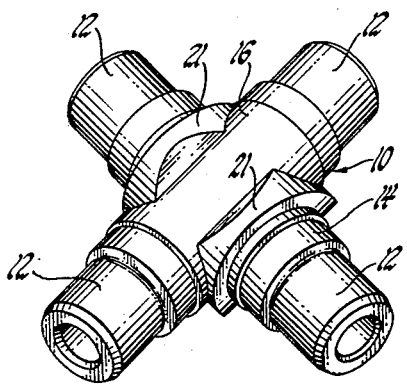
FIGURE 3 is an isometric view of the universal joint spider illustrated in FIGURES 1 and 2.

Referring more particularly to the drawings, FIGURES 1, 2 and 3 best illustrate the completed universal joint spider. The spider, illustrated generally by the numeral 10, includes four cylindrical machined surfaces 12 which serve as trunnions for the annulus of needle bearings, not shown, which is commonly received thereon. The spider 10 is formed of two members 14 and 16, which are resistance welded together such that the axis 18 and part 14 is in the same plane as the axis 20 of the part 16. The enlargement 21 is formed during the welding operation and represents material that is displaced during such operation.

Figure 4:
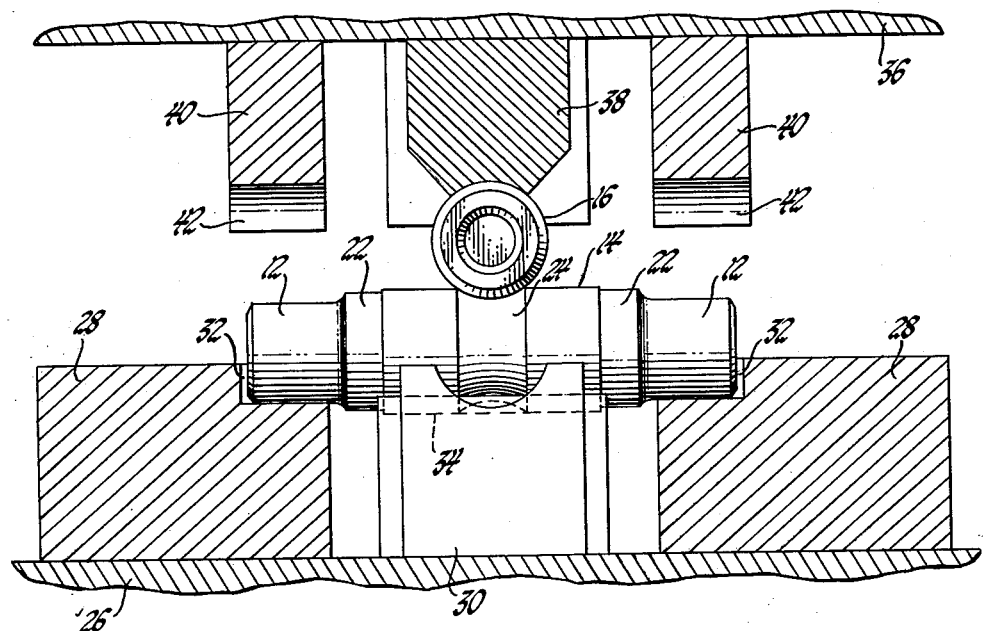
FIGURE 4 is a side view of a typical die and welding machine assembly with parts broken away and in section to illustrate the position of the various parts.

FIGURE 4 illustrates the shape of the members prior to assembly. As viewed in FIGURE 4, it is seen that member 14 is a generally cylindrical element with machined trunnion surfaces 12. The annular surfaces 22 may also be machined, if desired, to serve as seats for suitable seals or the like. Centrally of the member 14 an annular groove 24 is provided, the groove having a generally arcuate cross-sectional configuration. This serves as a means for locating members 14 and 16 in the proper manner, the member 16 having a groove similar to the member 24 formed centrally therein.

In FIGURE 4 the die or fixture in which the universal joint spider 10 is secured for the welding operation is shown. A suitable conventional welding press, having a table or platen 26, supports the lower die portions, including side members 28 and central member or post 30. Side members 28 are provided with semicylindrical grooves 32 to receive the trunnion ends 12 of the element 14. The central support 30 is also provided with a semicylindrical groove 34 to receive the center part of the element 14.

Secured in the upper portion 36 of the press or welding machine is a post 38 which engages the element 16 during the assembly operation. Side posts 40 are each provided with semicircular grooves 42 which are of generally the same diameter as the diameter of the bearing trunnions 12 of the element 14. Post 38 may also serve as an electrode, being provided with sufficient electrical conduit means to carry a welding current through the electrode and through the elements 14 and 16.

Figure 5:
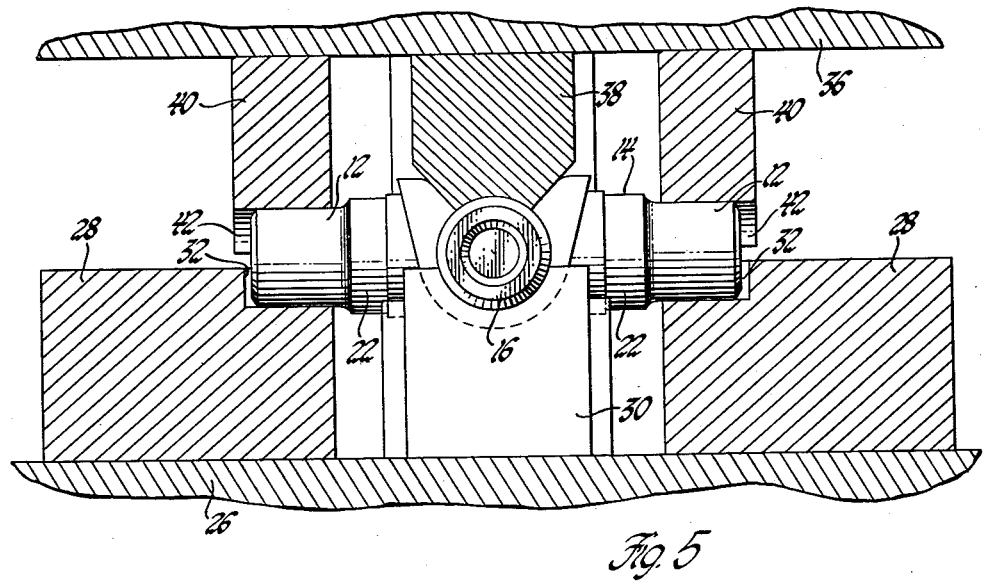
FIGURE 5 is a view similar to FIGURE 4 with the parts in a second position.

FIGURE 5 illustrates the assembled position of the universal joint spider 10 in the welding press and dies. The method in which the spider 10 is formed is as follows. The parts, already machined, are placed in the fixture or die, as illustrated in FIGURE 4, and a clamping force of the magnitude of 18,000 pounds presses the two elements 14 and 16 together. At this time a welding current is applied through the electrode or post 38 to heat the elements 14 and 16 and cause them to weld together. While the welding current is passing through the elements 14 and 16, the metal reaches a fluid state and the pressure applied to the elements causes the upper element 16 to move into and become a part of the lower element 14. The two portions of the die are forced together until such time as the upper side members 40 engage the bearing trunnions 12 of the lower element 14. In this position the axes 18 and 20 of the two elements are in substantially the same plane. At this time the pressure is released, as is the welding current, and the spider 10 is complete.

Thus, a universal joint spider is provided which may be simply assembled and which may be premachined in as efficient a manner as possible. Following the resistance welding of the two cylindrical elements, it is only necessary to grind or clean the parts before assembly into the complete universal joint. The many machining and tolerance problems generally encountered with forging and casting are eliminated. The result is a relatively inexpensive yet strong element of a universal joint.

What is claimed is:
1. A universal joint spider comprising:
   first and second members having cylindrical machined ends forming bearing trunnions, said members being disposed transversely to each other and having their axes in a common plane;
   said spider being formed by resistance welding said first and second members together under pressure.
2. A universal joint spider comprising:
   first and second generally cylindrical members disposed in transverse relation and having the axes thereof in a common plane;
   bearing trunnions formed on the ends of each of said members;
   said spider being formed by resistance welding said first and second members together under pressure after the formation of said bearing trunnions.

3. A method of making a universal joint spider comprising:
  machining the ends of two cylindrical members to form bearing trunnions;
  placing said cylindrical members in a fixture in transverse relationship to each other;
  applying pressure to said members to force said members together;
  and applying a welding current to said members under pressure to weld said members together, said pressure being applied to force said members together such that their axes fall into a common plane.

4. A method of making a universal joint spider comprising:
  machining the ends of two cylindrical members to form bearing trunnions;
  machining each of said cylindrical members to form an annular groove about the center thereof;
  placing one of said members in a welding machine;
  placing the other of said members in the welding machine and disposed transversely of said one member and such that said annular grooves are engaged;
  applying a force to said members in a direction tending to push them together;
  applying a welding current to said parts to weld said parts together, said pressure causing said parts to move into the same general plane when said welding current causes fluidity of the portions of said members mutually engaged;
  stopping said welding current and said force when said members have their respective axes in the same general plane;
  and removing said members from said welding machine in completed condition.

5. A method of making a universal joint spider comprising:
  placing two cylindrical members in a fixture in transverse relationship to each other;
  applying pressure to said members to force said members together;
  and applying a welding current to said members under pressure to weld said members together, said pressure being applied to force said members together such that their axes fall into a common plane.

6. A method of making a universal joint spider comprising:
  placing two cylindrical members in a fixture in transverse relationship to each other;
  applying pressure to said members to force said members together;
  applying a welding current to said members under pressure to weld said members together, said pressure being applied to force said members together such that their axes fall into a common plane;
  and machining the ends of said members to form bearing trunnions.

References Cited in the file of this patent
UNITED STATES PATENTS

| | | |
|---|---|---|
| 1,143,659 | Stern | June 22, 1915 |
| 1,143,660 | Stern | June 22, 1915 |
| 2,231,450 | Lachman | Feb. 11, 1941 |
| 2,241,871 | Tench | May 13, 1941 |
| 2,904,975 | Miller | Sept. 22, 1959 |